United States Patent Office 2,991,062
Patented July 4, 1961

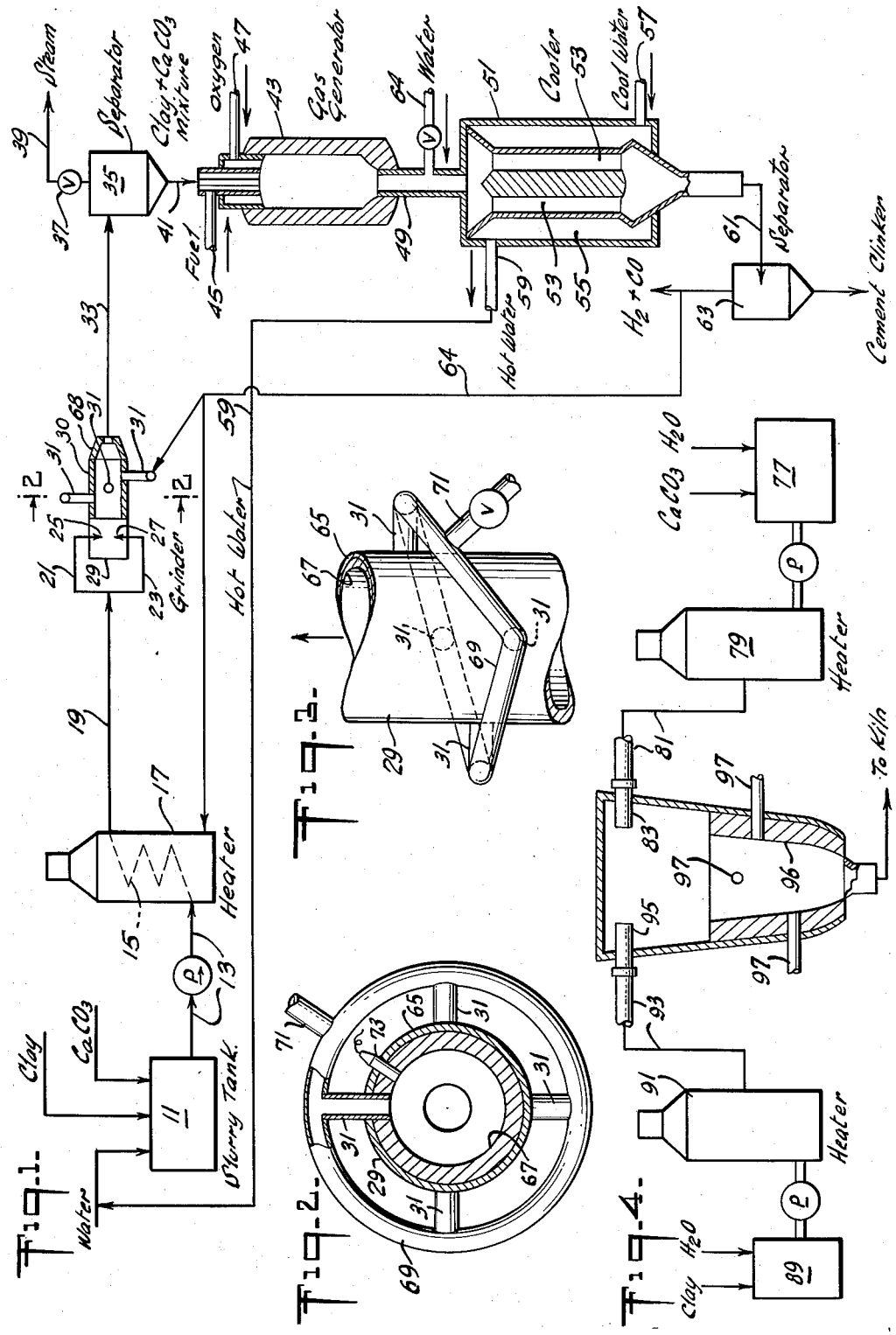

2,991,062
CEMENT MANUFACTURE
Harry V. Rees, Chappaqua, N.Y., and Peter L. Paull, Norwalk, Conn., assignors to Texaco Development Corporation, New York, N.Y., a corporation of Delaware
Filed Dec. 2, 1957, Ser. No. 700,055
13 Claims. (Cl. 263—53)

The present invention relates to a novel method of and apparatus for manufacturing cement, such as Portland cement, and is particularly concerned with simultaneously grinding and mixing the ingredients to form a thorough premix, followed by sintering the premix. In U.S. Patent 2,735,787 which issued February 21, 1956, to Du Bois Eastman et al. there is described and claimed a process for grinding solid materials such as coal or talc by forming a flowable mixture or slurry of mechanically crushed coarse particles in a vaporizable liquid such as water, forcing the mixture into an elongated tube, heating the mixture as it passes through the tube to a temperature above the boiling point of the liquid component of the slurry, thereby vaporizing the liquid component, and forming a dispersion of the solid particles in the resulting vapor. This dispersion is passed through a succeeding zone of high velocity flow wherein the flowing stream is subjected to extreme turbulence and a velocity sufficiently great to effect disintegration of the coarse particles, after which the stream containing finely ground solids suspended therein is discharged from the high velocity zone. Velocity should exceed 25 feet per second, but is generally much higher, such as hundreds and even thousands of feet per second.

We have found that the grinding operation described in the preceding paragraph is especially adapted to the manufacture of Portland cement because of several advantages which were not previously available. In the first place, an intimate and thorough mixture of Portland cement ingredients, such as argillaceous and calcareous materials, can be intimately formed simultaneously with an extremely fine grind which is essential to the production of satisfactory finished cement. It is especially important that the ingredients be finely pulverized and uniformly mixed. Otherwise, the reactions in the kiln will not take place uniformly throughout the mass. An area of calcareous particles may be so far removed from a region of argillaceous component that these particles will remain as free lime.

Another important advantage is that the coarse ingredients may be mixed and ground while wet or dry, yet emerge from the grinding operation in a hot dry state so that the premix can be fed directly to the sintering kiln without requiring separate steps of drying or preheating.

A particularly important feature of this invention is the provision of means for rapidly heating to an incipient fused condition the finely ground particles of cement ingredients after the disintegration step and prior to the removal of part or all of the conveying vapor therefrom. The purpose of this important step is to sinter and nodulize the particles slightly, and to cause a slight agglomeration of the fines, thereby preventing their subsequent loss.

The principles of the invention will be described more in detail with reference to the accompanying drawings, wherein:

FIG. 1 is a schematic side elevational view, parts being broken away and shown in section, of a typical arrangement of apparatus for manufacturing cement by the invention;

FIG. 2 is a cross sectional view taken along the line 2—2 in FIG. 1;

FIG. 3 is a plan view of a part of the apparatus shown in FIG. 2; and

FIG. 4 is a schematic side elevational view, parts being broken away and in section, of a modified form of apparatus.

Referring to FIG. 1, there is shown a tank or container 11 within which a flowable mixture such as a slurry is made up by introducing rough ground argillaceous and calcareous particles in the proper proportions and mixing them thoroughly with a vaporizable liquid such as water. The proportion of solids to liquid may vary widely, as from 2:1 to 1:2 by weight, a proportion of 1:1 being especially advantageous. For simplicity, water will be mentioned hereinafter, but it is apparent that other liquids may be used such as kerosene, coal tar distillates, alcohol, glycols, and the like.

The slurry is then pumped through a conduit 13 into a pipe coil 15 constituting an elongated tubular heating zone in a heater 17 wherein the slurry is heated to a temperature sufficient to vaporize the water and form a flowing dispersion of solid particles in steam. This dispersion flows through an outlet conduit 19 and is separated into two streams which pass through conduits 21 and 23 to a pair of opposed nozzles 25 and 27 in a grinding head or housing 30. The passages in the nozzles are of much smaller cross sectional area than the conduits 21 and 23 so that the velocities of the streams of dispersion are increased to high values. Upon leaving the opposed outlets of nozzles 25 and 27 the two streams of dispersion impinge mutually against one another adjacent one end of housing 30, preferably at a large angle such as 180°, and the solid particles are disintegrated to an extremely fine size. This is described in Patent 2,846,150.

Thereafter the stream of dispersion of disintegrated fine particles and steam flowing at relatively low velocity pass axially through a heating section 30 of the grinding head constituting a preliminary heating chamber wherein they are heated by introducing into direct contact therewith at least one flame directed transversely of the path of flow of the stream of dispersion, such as oxy-fuel flames from a plurality of burner nozzles 31 to a temperature sufficient to produce or cause a slight incipient fusion and nodulizing and a slight agglomeration of the fine particles. For example, the flames from burners 31 may be hot enough to maintain the inside of heating section 30 at a temperature of 1400 to 1600° C.

The steam dispersion then flows through a conduit 33 to a separator 35, such as a centrifugal separator of the cyclone type, wherein steam is separated and passes off through a throttle valve 37 and conduit 39.

The intimately mixed solid particles drop to the bottom and are discharged through a conduit 41 into a suitable kiln comprising a sintering zone for completing the sintering operation by heating the particles to a temperature sufficient to convert them to cement clinker. While this may be a long inclined cylindrical kiln of a type conventional in cement roasting, we have found it desirable to convert the premix to cement clinkers by passing it into a synthesis gas generator 43 concurrently with the introduction of a suitable carbonaceous fuel such as hydrocarbon gas, fuel oil or pulverized coal through a conduit 45, and of oxygen through a conduit 47.

In the synthesis gas generator the fuel is partially or incompletely oxidized with oxygen under conditions to form a combustible gas mixture of hydrogen and carbon monoxide by controlling the proportions of carbonaceous fuel and oxygen so that combustion of said carbonaceous fuel is incomplete. The heat of oxidation sinters the cement ingredients to form clinker particles which leave the generator through outlet or exit 49 along with the synthesis gas and pass through a cooler 51 having a plurality of passages 53 for the hot material, surrounded by a water jacket 55 to which cool water is supplied by an inlet conduit 57 to be passed in indirect heat exchange relationship with the hot material, and from which hot water leaves through an outlet conduit 59. The hot water passes to the tank 11 for making up the flowable mixture or slurry, so that the heat is recovered and improves the economy of operation. The cooled synthesis gas (which is preferably still above 100° C. to prevent steam condensing on the cement particles) along with sintered particles of Portland cement clinker, then leave the cooler 51 at the bottom and pass through a conduit 61 to a second separator 63 of the centrifugal cyclone type which removes the synthesis gas and other vapors such as steam at the top and discharges the particles of cement clinker at the bottom for subsequent grinding to form the finished cement.

A small amount of water or a water slurry of gypsum in amount sufficient to control the setting time of the cement may be introduced, if desired, through a conduit 64 between the generator and cooler.

Referring to FIGS. 2 and 3, the construction of the heater portion 30 of the grinder is shown in greater detail. It comprises a steel shell 65 of cylindrical shape lined on the inside with a refractory lining 67 of fire clay or the like which is able to stand the temperature of the operation. Adjacent its outlet the heater portion is frusto conical as at 68. In the particular embodiment shown there are four radial burner nozzles 31 which are spaced at quarter points around the circumfrence for introducing flame into the chamber in a direction transversely of the longitudinal axis. Furthermore, the burner nozzles 31 are successively spaced longitudinally from one another so as to assure heating of the dispersion continuously as it flows through the section 29. Nozzles 31 are supplied with the combustible oxy-fuel mixture by a header 69 having a supply tube 71.

For igniting the oxy-fuel mixtures leaving the nozzles 31 there is provided a spark plug 73 extending through the shell 65 and lining 67 adjacent to one of the burner nozzles. Upon ignition of one stream, of course, the others also are ignited. It is desirable to ignite the streams from the burner nozzles 31 before introduction of the flowing dispersion from the heater tube 15, both because of the greater ease of ignition at this time and because of the need for preheating the refractory lining 67.

We find it particularly advantageous to heat the portion 30 of the grinder by the combustion of synthesis gas leaving the separator 63, part of which may be delivered by a conduit 64 to nozzles 31 (by way of the inlet tube 71) along with a supply of gaseous oxygen. Also the heater 17 may be operated by the combustion of part of the synthesis gas leaving the top of separator 63.

*Example*

A slurry is made up in tank 11 comprising 50% by weight of water, 17% of clay, and 33% of coarse ground limestone. The resulting slurry is passed into 1,320 feet of heated ½" iron pipe at a pressure of 1450 p.s.i.g. (pounds per square inch gauge) at a rate of 1348 pounds per hour. The slurry is heated to a maximum temperature of 720° F. at the heater pipe outlet where the discharge pressure is 725 p.s.i.g.

The resulting dispersion then flows to a pair of 180° opposed nozzles 25 and 27 having 5/32" discharge orifices spaced 5/8" apart. Then the dispersion of disintegrated particles in steam flows at low velocity through the heater portion 29 of the grinding head wherein it is heated by flames from the burner 31, supplied with a mixture of oxygen and synthesis gas, to a maximum temperature of 1500° C. thereby incipiently fusing and causing some agglomeration of the mixed fine particles.

The dispersion then continues to flow into the separator 35 wherein 90% of the steam leaves the top and 10% of the steam leaves the bottom along with the cement premix and enters the synthesis gas generator 43.

The synthesis gas generator is operated at a pressure of 3000 p.s.i.g. and a temperature of 1425° C. as a result of partially combusting fine bituminous coal particles with oxygen. The resulting cement clinker particles, which include not only the clinkered clay and limestone agglomerates but also the ash from coal combustion, leave the bottom of the generator along with the hot synthesis gas and are cooled to a temperature of 200° C. in the cooler 51.

This cooled mixture then is passed to the separator 63 wherein hot dry cement clinker particles are removed at the bottom while synthesis gas together with any steam are discharged at the top. By maintaining the temperature of separation above the boiling point of water, the condensation of water vapor is prevented so as to maintain the cement clinker in a dry condition.

Referring to FIG. 4 there is shown a modification wherein flowable mixtures or slurries of clay and limestone are separately formed, and then are ground by discharging two separately constituted opposed jets against one another. The coarse limestone particles are mixed with water in a tank 77 and passed through a heating coil arranged within a heater 79 to vaporize the water and form or generate a flowing dispersion of solid particles in steam which is then passed through a conduit 81 to a nozzle 83 in a grinder 85. Concurrently, coarse clay particles are mixed with water in a tank 89 to form a separate flowable mixture which is passed through a separate heating zone in a coil within a heater 91 to generate a separate dispersion which flows through a conduit 93 to a nozzle 95 diametrically opposed to the nozzle 83. The resulting two separate streams or jets of dispersion are directed to impinge or flow at a high velocity against one another at 180° to disintegrate the clay and limestone particles which then mix thoroughly together upstream of the heater portion or preliminary heating zone 96 of the grinder head wherein they are heated and incipiently fused by flames from the nozzles 97 as described in connection with FIGS. 1 to 3. The dispersion then flows to a vapor separator and then to any suitable type of kiln for completion of the sintering operation.

Among useful calcareous materials are limestone, cement rock, chalk, marl, marine shells and alkali waste (precipitated calcium carbonate). Among useful argillaceous materials are clay, shale, slate, blast furnace slag, ashes and cement rock.

When natural cement rock has the proper composition it may be ground and sintered by using the described method and apparatus. However, where the natural composition is deficient, it may be mixed with one or more of the other ingredients mentioned above.

When using a combustible liquid such as kerosene, coal tar distillates, alcohols, or glycols in the flowable mixture the valve 37 in the conduit 39 leading from the top of separator 35 is closed so that the whole effluent from conduit 33, including combustible vapor and disintegrated particles, passes to the sintering apparatus. The combustible vapors burn to assist the sintering which converts the particles to cement clinker and, when the sintering apparatus is a synthesis gas generator, to burn partially and form carbon monoxide and hydrogen as products. Of course, when the vapor of the dispersion is a combustible substance it will also burn partially in grinding head 29 or 96, and the resulting carbon monoxide and hydrogen will pass with unburned vapor into the sintering apparatus where part or all will burn. In a generator, such hydrogen and carbon monoxide will supplement the product of the generator, while the residual unburned vapors will burn partially to carbon monoxide and hydrogen.

Obviously, many modifications and variations of the invention, as hereinbefore set forth, may be made without departing from the spirit and scope thereof, and therefore only such limitations should be imposed as are indicated in the appended claims.

We claim:
1. In a method for manufacturing cement which comprises forming at least one flowable mixture of coarse particles of at least one solid cement ingredient in vaporizable liquid, passing said mixture into and through an elongated tubular heating zone, heating said mixture during passage through said tubular zone to vaporize said liquid thereby forming a dispersion of solid particles in vapor, passing said dispersion through a succeeding zone of high velocity flow while subjecting the flowing stream therein to turbulence and a velocity sufficient to effect disintegration of said coarse particles forming a stream of a dispersion of disintegrated particles in vapor, and passing the disintegrated particles into a sintering zone while heating said particles therein to a temperature sufficient to convert said particles to cement clinker, the improvement which comprises: passing said stream of dispersion of disintegrated particles through a preliminary heating zone between said succeeding zone and said sintering zone, while maintaining the inside of said preliminary heating zone at a temperature above 1400° C. and heating said particles as they pass therethrough to a temperature sufficient to produce incipient fusion of said particles by introducing into said preliminary heating zone into direct contact with said stream at least one flame directed transversely of the path of flow of said stream of dispersion.

2. In the method in accordance with claim 1, the further improvement wherein the particles in said first named flowable mixture are argillaceous material, and wherein there is also formed a second separate flowable mixture of calcareous material in vaporizable liquid, said improvement also comprising passing said separate flowable mixtures through separate heating zones to generate separate flowing streams of vaporous dispersions of said materials, said separate streams being directed to impinge upon one another in said succeeding zone of high velocity flow to disintegrate and thoroughly mix said particles together upstream of said preliminary heating zone.

3. In the method of claim 1, said at least one flame comprising a plurality of transversely directed flames successively spaced from one another both circumferentially and longitudinally of the path of flow of said stream of dispersion.

4. In the method of claim 1, said vaporizable liquid being a combustible liquid, and the vapor of said combustible liquid passing into said sintering zone along with said disintegrated particles and burning therein to convert said particles to cement clinker.

5. In the method of claim 1, the further improvement wherein sintering of said particles of cement ingredients is accomplished by passing said ingredients into a gas generating zone concurrently with a supply of carbonaceous fuel and oxygen, and burning said fuel therein under conditions producing a combustible gas comprising carbon monoxide concurrently with the sintering of said cement ingredients by controlling the proportions of carbonaceous fuel and oxygen so that combustion of said carbonaceous fuel is incomplete.

6. In the method of claim 5, passing the resulting combustible gas along with the sintered cement ingredients out of said gas generator, separating said combustible gas from the sintered cement ingredients, and burning said combustible gas in at least one of said preliminary heating zones and the vicinity of said tubular heating zone to provide flame for the heating of said flowable mixture and said stream of dispersion.

7. In the method of claim 5, passing the resulting combustible gas along with the sintered cement ingredients out of said generator, passing vaporizable liquid in indirect heat exchange relationship therewith for cooling said gas and cement ingredients and concurrently heating said liquid, and passing the liquid so heated to said flowable mixture as makeup liquid therefor.

8. In apparatus for manufacturing cement comprising a tank for forming a flowable mixture of coarse solid particles of at least one cement ingredient and a vaporizable liquid, an elongated heating tube connected to said tank, a heater for heating said tube sufficiently to vaporize said liquid to vapor and form a flowing dispersion of coarse particles in vapor, means connected to said heating tube for carrying said dispersion in high velocity turbulent flow to effect disintegration of said coarse particles, and a kiln connected to said last named means for sintering the disintegrated particles, the improvement which comprises: a preliminary heating chamber connected between said last named means and said kiln for heating said particles to incipient fusion as said dispersion flows axially therethrough, said heating chamber having at least one nozzle for introducing at least one flame into said chamber in a direction transversely of the longitudinal axis thereof, and a vapor separating device connected between said heating chamber and said kiln for separating at least part of said vapor from said solid particles before introduction of said particles into said kiln.

9. Apparatus for manufacturing cement comprising a container for forming a flowable mixture of coarse solid particles of cement ingredient in a vaporizable liquid; an elongated heating tube connected to said container; means connected to said heating tube for carrying said dispersion in high velocity turbulent flow to effect disintegration of said coarse particles; a preliminary heating chamber downstream of said second means for heating said particles to incipient fusion as said dispersion flows therethrough; and a kiln connected to said preliminary heating chamber for sintering the disintegrated particles of cement ingredient, said kiln being a gas generator having an exit for combustile gas and sintered cement clinker, said apparatus also comprising a cooling device connected to said exit for cooling the sintered cement ingredients and the gases from said generator by indirect heat exchange as they flow therethrough, said cooling device having an inlet an outlet for cooling liquid, said apparatus also comprising a conduit establishing communication between said outlet and said container for delivering hot liquid to said container for preparing said flowable mixture.

10. Apparatus for manufacturing cement comprising a container for forming a flowable mixture of coarse solid particles of cement ingredient in a vaporizable liquid; an elongated heating tube connected to said container; means connected to said heating tube for carrying said dispersion in high velocity turbulent flow to effect disintegration of said coarse particles; a preliminary heating chamber downstream of said second means for heating said particles to incipient fusion as said dispersion flows therethrough; and a kiln connected to said preliminary heating chamber for sintering the disintegrated particles of cement ingredient, said kiln being a gas generator having an exit for combustible gas and sintered cement clinker, means connected to said exit for separating the combustible gas from the sintered cement particles, and means for conducting said combustible gas from said last named means to at least one of said preliminary heating chambers and the vicinity of said heating tube for supplying heat thereto.

11. Apparatus in accordance with claim 8 wherein said first named means and said preliminary heating chamber constitute a grinding head comprising a housing having a longitudinal axis, means providing a plurality of passages having opposed outlets for introducing mutually impinging jets of dispersion against one another within said housing adjacent one end thereof, and at least one burner nozzle in said housing transverse to the longitudinal axis of said housing downstream of said outlets for introducing flame therein to incipiently fuse solid particles flowing axially therethrough.

12. Apparatus in accordance with claim 11 comprising a plurality of said burner nozzles successively spaced from one another both circumferentially and longitudinally of said housing.

13. Apparatus in accordance with claim 12, also comprising means in said housing for igniting the combustible fluid introduced by said nozzles.

References Cited in the file of this patent

UNITED STATES PATENTS

| | | |
|---|---|---|
| 2,026,441 | Shafter et al. | Dec. 31, 1935 |
| 2,270,870 | Ditto et al. | Jan. 27, 1942 |
| 2,543,987 | Ramsay | Mar. 6, 1951 |
| 2,580,235 | Lellep | Dec. 25, 1951 |
| 2,735,787 | Eastman et al. | Feb. 21, 1956 |
| 2,821,346 | Fisher | Jan. 28, 1958 |